(12) United States Patent
Gouverneur

(10) Patent No.: US 8,941,482 B1
(45) Date of Patent: Jan. 27, 2015

(54) AUTOMATING TURN INDICATION SYSTEMS

(76) Inventor: BenJoaquin Tomas Gouverneur, Oakland, CA (US)

( * ) Notice: Subject to any disclaimer, the term of this patent is extended or adjusted under 35 U.S.C. 154(b) by 84 days.

(21) Appl. No.: 13/531,354

(22) Filed: Jun. 22, 2012

Related U.S. Application Data

(60) Provisional application No. 61/500,450, filed on Jun. 23, 2011.

(51) Int. Cl.
*B60Q 1/34* (2006.01)

(52) U.S. Cl.
USPC ............... 340/465; 340/995.1; 340/539.1

(58) Field of Classification Search
USPC ........... 340/465, 475, 988–990, 468, 995.1, 340/995.19, 995.2, 905, 435, 476, 539.1, 340/425.5
See application file for complete search history.

(56) References Cited

U.S. PATENT DOCUMENTS

| | | | | |
|---|---|---|---|---|
| 5,506,774 A * | 4/1996 | Nobe et al. | ................ | 701/423 |
| 5,887,269 A * | 3/1999 | Brunts et al. | ............... | 701/486 |
| 5,951,621 A * | 9/1999 | Palalau et al. | ............ | 340/995.2 |
| 6,204,759 B1 * | 3/2001 | Jahnke | ..................... | 340/476 |
| 6,268,794 B1 * | 7/2001 | Tzanev | ..................... | 340/475 |
| 2003/0141964 A1 * | 7/2003 | Su et al. | .................. | 340/425.5 |
| 2006/0164226 A1 * | 7/2006 | Hartle | ........................ | 340/457 |
| 2007/0010919 A1 * | 1/2007 | Ammon | ......................... | 701/1 |
| 2008/0082233 A1 * | 4/2008 | Hayashi | ....................... | 701/36 |
| 2008/0281960 A1 * | 11/2008 | Schibler | ...................... | 709/224 |

* cited by examiner

*Primary Examiner* — Daniel Previl
(74) *Attorney, Agent, or Firm* — Haverstock & Owens LLP

(57) ABSTRACT

A turn indicator system determines when a moving vehicle has completed a turn and automatically turns off a turn indicator light. The system includes turn indicator lights, an accelerometer, and a processor. The accelerometer can sense acceleration in two-axis or three-axis. The processor is configured to receive the sensed accelerometer data and to determine when a vehicle has completed a turn based on the received accelerometer data. In response to determining that a turn is completed, the processor signals the appropriate turn indicator light to turn off. The turn indicator system can be implemented in a single-track vehicle, such as a bicycle or a motorcycle, or in a multi-track vehicle, such as an automobile.

19 Claims, 3 Drawing Sheets

AUTOMATING TURN INDICATION SYSTEMS

RELATED APPLICATIONS

This Patent Application claims priority under 35 U.S.C. 119 (e) of the U.S. provisional application Ser. No. 61/500,450, filed Jun. 23, 2011, and entitled "Automating Turn Indication Systems", by this same inventor. This application incorporates U.S. provisional application Ser. No. 61/500,450 in its entirety by reference.

FIELD OF THE INVENTION

The present invention is generally directed to the field of turn indication systems for moving vehicles. More specifically, the present invention is directed to automating turn indication systems for moving vehicles.

BACKGROUND OF THE INVENTION

A turn indicator is used to signal that a vehicle is going to make a left turn or a right turn. A turn indicator light is manually turned on by a user. In automobiles, automatic turn off of the turn indicator light is implemented mechanically when a turn is completed. The steering wheel rotates within a steering column. Rotation and counter-rotation of the steering wheel as performed when making and completing a vehicle turn trips a switch coupled to the steering column, thereby triggering a turn off signal sent to the turn indicator light. In motorcycles, although the handlebars do rotate, steering is primarily accomplished by tilt-steering, which is leaning to one side or the other. At very low speed, or at stand still, the handlebars are used to turn the vehicle. However, at higher speed, particularly at operating speed, leaning is required for steering, not rotation of the handlebars. If the handlebars are rotated while at speed, the motorcycle becomes unstable because the vector of the rotated front wheel is no longer along the vector of vehicle motion. Motorcycles also use turn indicator lights that are manually turned on by the user. However, since the motorcycles does not use rotation of the handlebars to steer, the turn indicator light auto-cancellation feature used in automobiles is not applicable. As such, a motorcycle user is required to manually turn off the turn indicator lights. Bicycles typically do not include turn indicator lights, but if they did, a bicycle user would also be required to manually turn off the turn indicator lights as bicycles also use tilt-steering.

SUMMARY OF THE INVENTION

A turn indicator system determines when a moving vehicle has completed a turn and automatically turns off a turn indicator light. The system includes turn indicator lights, turn indicator light switches, an accelerometer, and a processor. The accelerometer can sense acceleration in two-axis or three-axis. The processor is configured to receive the sensed accelerometer data and to determine when a vehicle has completed a turn based on the received accelerometer data. In response to determining that a turn is completed, the processor signals the appropriate turn indicator light to turn off. In some embodiments, the turn indicator system is implemented in a single-track vehicle, such as a bicycle or a motorcycle. In other embodiments, the turn indicator system is implemented in a multi-track vehicle, such as an automobile. In still other embodiments, the turn indicator system is implemented in vehicles using a drive by wire implementation.

In an aspect, a method of controlling lights on a vehicle is disclosed. The method includes turning on a turn indicator light. The method also includes sensing acceleration changes of the vehicle. The method also includes determining if a vehicle turn is initiated and completed according to the sensed acceleration changes. The method also includes turning off the turn indicator light when it is determined that the vehicle turn is completed. In some embodiments, acceleration changes include lateral acceleration changes. In some embodiments, the vehicle is a single-track vehicle that utilizes tilt-steering, wherein sensing acceleration changes includes sensing the vehicle tilting from an upright position. In some embodiments, the vehicle turn is determined to be initiated if the vehicle tilts away from the upright position beyond a first threshold angle, and the vehicle turn is determined to be completed if the vehicle turn has been determined to be initiated followed by the vehicle tilting back toward the upright position within a second threshold angle. The first threshold angle can be the same or different than the second threshold angle. In some embodiments, the method can also include determining if a vehicle speed is greater than a minimum speed threshold value using the sensed acceleration changes, and only determining that the vehicle turn is initiated if the vehicle speed is greater than the minimum speed threshold value. In other embodiments, the vehicle is a multi-track vehicle, further wherein determining if the vehicle turn is initiated and completed comprises determining a lateral acceleration change corresponding to the vehicle turning. In some embodiments, the method also includes determining if the sensed acceleration changes correspond to a deceleration of the vehicle and turning on a brake light in response to determining that the vehicle is decelerating. In some embodiments, the method also includes adjusting the deceleration determination by compensating for deceleration corresponding to the vehicle traveling uphill or downhill. In some embodiments, the method also includes sensing an orientation of the vehicle and filtering the sensed accelerating changes according to the sensed orientation. In some embodiments, the method also includes sensing an ambient light proximate the vehicle and turning on a vehicle light if the sensed ambient light is below a threshold value.

In another aspect, an apparatus to control lights on a vehicle is disclosed. The apparatus includes an accelerometer and a processor coupled to the accelerometer. The accelerometer is configured to sense acceleration changes of the vehicle. The processor is coupled to the accelerometer to receive the sensed acceleration changes. The processor is configured to determine if a vehicle turn is initiated and completed according to the sensed acceleration changes, and to send a turn off signal to a turn indicator light when it is determined that the turn is completed. In some embodiments, the vehicle is a single-track vehicle that utilizes tilt-steering, wherein the sensed acceleration changes include acceleration changes corresponding to the vehicle tilting from an upright position. In other embodiments, the vehicle is a multi-track vehicle, wherein the sensed acceleration changes include acceleration changes corresponding to lateral acceleration changes of the vehicle while turning. In some embodiments, the processor is further configured to determine deceleration along a forward direction and to turn on a brake light in response to determining that the vehicle is decelerating. In some embodiments, the processor is further configured to adjust the deceleration determination by compensating for deceleration corresponding to the vehicle traveling uphill or downhill. The apparatus can also include a gyroscope to sense an orientation of the vehicle, wherein the processor is further configured to filter the sensed accelerating changes according to the sensed orientation. The apparatus can also include an ambient light sensor coupled to the processor and configured to sense ambient light, wherein the processor is further configured to send a turn on signal to a vehicle light if the sensed ambient light is below a threshold value.

In yet another aspect, a single-track vehicle having tilt-steering is disclosed. The vehicle includes a left turn indicator light, a right turn indicator light, an accelerometer, a gyroscope, and a processor. The accelerometer is configured to sense acceleration changes of the vehicle. The gyroscope is configured to sense an orientation of the vehicle. The processor is coupled to the accelerometer to receive the sensed acceleration changes and to the gyroscope to receive the sensed vehicle orientation. The processor is configured to determine if a vehicle left turn or vehicle right turn is initiated and completed according to the sensed acceleration changes and the sensed vehicle orientation, and to send a turn off signal to either the left turn indicator light or to the right turn indicator light when it is determined that the turn is completed.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Figure 1:
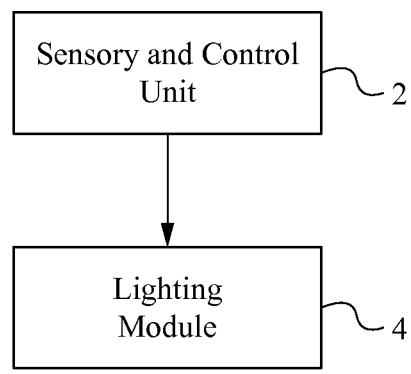
FIG. 1 illustrates a generalized functional block diagram of a turn indicator system according to an embodiment.

Embodiments of the present application are directed to a turn indicator system. Those of ordinary skill in the art will realize that the following detailed description of the turn indicator system is illustrative only and is not intended to be in any way limiting. Other embodiments of the turn indicator system will readily suggest themselves to such skilled persons having the benefit of this disclosure.

Reference will now be made in detail to implementations of the turn indicator system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of a turn indicator system are directed to determining when a moving vehicle has completed a turn and to automatically turn off a turn indicator light. The system includes turn indicator lights, an accelerometer, and a processor. In some embodiments, the turn indicator system is implemented using turn indicator user inputs and turn indicator lights included as part of the vehicle. In other embodiments, turn indicator user inputs and turn indicator lights are implemented separately. For example, a vehicle user can wear turn indicator lights on a helmet or jacket. In some embodiments, the accelerometer senses acceleration in two-axis. In other embodiments, the accelerometer senses acceleration in three-axis. The processor is configured to receive the sensed accelerometer data and to determine when a vehicle has completed a turn based on the received accelerometer data. In response to determining that a turn is completed, the processor signals the appropriate turn indicator light to turn off. In some embodiments, each turn indicator light functions autonomously, turning on and off while in a state of "indicating", and is reset to a state of "not indicating", where the light is continuously off. In other embodiments, a separate switch is coupled to each turn indicator light, and the processor signals the switch to turn on, which enables the "indicating" state of the turn indicator light, or the processor signals the switch to turn off, which disables the turn indicator light. In some embodiments, the system and method are implemented in a single-track vehicle, such as a bicycle or a motorcycle. A single-track vehicle has its wheels aligned along a single axis, or track. Single-track vehicles utilize tilt-steering to turn the vehicle while at speed. Tilting, or leaning, of the vehicle is sensed by the accelerometer. Based on the sensed accelerometer data, the processor determines when the vehicle tilts to one side to accomplish a turn, and then the vehicle tilts back to upright after completing the turn. Upon determining that the vehicle has returned upright, or near-upright, a turn off signal is sent to the turn indicator light.

In other embodiments, the system and method are implemented in a multi-track vehicle, such as an automobile or truck. A multi-track vehicle has its wheels aligned along multiple different tracks, typically two tracks. Single-track vehicles utilize tilt-steering to turn the vehicle while at speed. Multi-track vehicles do not use tilt-steering and therefore do not experience appreciable lean while turning. However, turning does result in tangential acceleration that is determined according to the sensed accelerometer data. Based on the sensed accelerometer data, the processor determines when the vehicle enters into and completes a turn, upon which a turn off signal is sent to the turn indicator light.

FIG. 1 illustrates a generalized functional block diagram of a turn indicator system according to an embodiment. The turn indicator system is configured to be coupled to a vehicle, such as a bicycle, motorcycle, or automobile. It is understood that the turn indicator system can be applied to other types of vehicles. The turn indicator system includes a sensory and control unit 2 coupled to a lighting module 4. The sensory and control unit 2 includes sensors and user input mechanisms for obtaining data and a processor for receiving and processing the data. Based on the results of processing the data, the processor may send control signals to the lighting module 4. In some embodiments, the processor determines an acceleration force corresponding to the vehicle entering into and completing a turn. The acceleration force can be the result of a vehicle lean, as in a single track vehicle, or the result of a tangential acceleration, as in a multi-track vehicle. This determination is subsequently used to send control instructions to the lighting module 4 to turn off a turn indicator light. Other determinations and controls can also be made including, but not limited to, turning on or off headlights and/or taillights based on an ambient light sensor, and turning on a brake light based on a determined deceleration of the vehicle.

Figure 2:
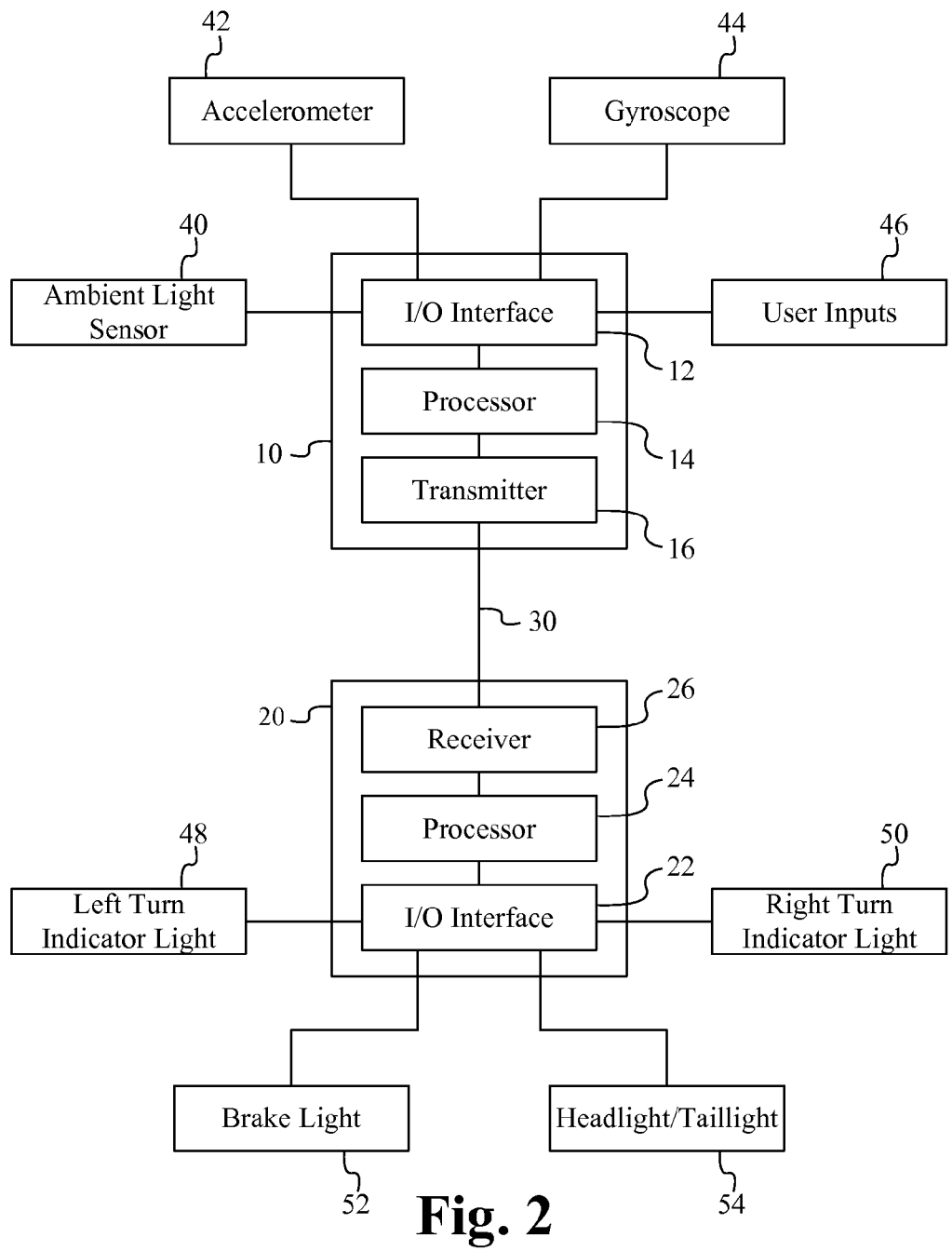
FIG. 2 illustrates an exemplary functional block diagram of the turn indicator system according to an embodiment.

FIG. 2 illustrates an exemplary functional block diagram of the turn indicator system according to an embodiment. The turn indicator system includes a primary control module 10 coupled to a secondary control module 20. The primary control module 10 includes an input/output (I/O) interface 12, a processor 14, and a transmitter 16. The secondary control module 20 includes an I/O interface 22, a processor 24, and a receiver 26. The primary control module 10 is coupled to the secondary control module 20 by communication means 30. The communication means can include any conventional means for communicating electronic signals, wired or wireless. In this exemplary configuration, the turn indicator system is configured for wireless communication between the primary and second control modules, and as such includes a transmitter and receiver. It is understood that where the turn indicator system is configured for wired communication between the primary and secondary control modules, the transmitter and receiver are not necessary. If the turn indicator system is implemented in a vehicle having a networking scheme, such as CAN, a transceiver and appropriate controller can be included.

The turn indicator system also includes an ambient light sensor 40, an accelerometer 42, and user inputs 46. The user inputs 46 are for the user of the vehicle to enable a left turn indicator light or a right turn indicator light. The user inputs 46 can be implemented using any conventional means for the user of the vehicle to signal the processor 14 to enable either the left turn indicator signal or the right turn indicator signal. In some embodiments, two separate push buttons are used as the user inputs 46, a first push button corresponding to the left turn indicator signal and a second push button corresponding to the right turn indicator signal. In some embodiments, pushing the push button sends a signal to the processor 14 to enable the corresponding turn indicator signal. The processor 14 in turn sends a control signal to enable the corresponding turn indicator signal light. In some embodiments, the control signal turns on a corresponding switch coupled to the turn indicator signal light. In some embodiments, the switch is included in the control module 20. In other embodiments, the switch is included as part of the right turn indicator light 40 or the left turn indicator light 48. In other embodiments, pushing the push button sends a signal to the turn indicator light 48 or 50, such as sending an enable signal to the turn indicator light switch coupled to the turn indicator light, thereby bypassing the processor 14. In an exemplary implementation, each turn indicator light functions autonomously, turning on and off while in a state of "indicating", and is reset to a state of "not indicating", where the light is continuously off.

The accelerometer 42 senses a change in acceleration along one or more axis. The accelerometer is implemented as either a two-axis accelerometer or a three-axis accelerometer. In the case of a two-axis accelerometer, the two axis, x-axis and y-axis, form a planar surface. Typically, the accelerometer is calibrated such that the planar surface corresponds to a flat surface when the vehicle is completely upright. A flat surface is generally considered to be a surface having a constant gravity at each point on the plane. In an exemplary configuration, the x-axis is parallel to the single-track or multi-track axis of the vehicle, and the y-axis is the lateral motion of the vehicle. In the case of a three-axis accelerometer, the third axis, z-axis, is the vertical axis, which is useful when considering vehicle movement uphill or downhill. The ambient light data sensed by the ambient light sensor 40, the change in acceleration data sensed by the accelerometer 42, and the user input data received by the user inputs 46 is sent to the processor 14 via the I/O interface 12.

In some embodiments, the turn indicator system also includes a gyroscope 44. In this exemplary implementation, the gyroscope 44 is for measuring the orientation of the vehicle. In some embodiments, the gyroscope 44 is a MEMS gyroscope. It is understood that alternative types of conventional gyroscopes can be used to measure an orientation of the vehicle. The sensed orientation data is used by the processor 14 to filter the sensed acceleration data, such as forming IMUs.

The processor 24 receives control signals transmitted from the processor 14, decodes the received control signals and sends corresponding control signals to the appropriate lights 48, 50, 52, or 54 via the I/O interface 22.

In operation, the processor 14 receives acceleration change data from the accelerometer 42, and optionally receives vehicle orientation data from the gyroscope 44. The processor 14 filters the received acceleration change data and orientation data, and determines if the vehicle has made a turn, and the direction of turn, left or right. Where the vehicle is a single-track vehicle, a turn can be determined by calculating a lean, or tilt, of the vehicle relative to an upright position. The tilt of the vehicle is measured as a tilt angle of the vehicle along the single-track relative to an upright position. The upright position is perpendicular to the "flat", calibrated planar surface used by the accelerometer. If it determined that the vehicle tilts beyond a first threshold angle and then returns within a second threshold angle of the upright position, the vehicle is determined to have completed a turn. In response to determining if a turn is completed, the processor 14 generates and transmits a control signal to the appropriate turn indicator light 48 or 50, or corresponding turn indicator light switch, to turn off the turn indicator light. In some embodiments, the first threshold angle is the same as the second threshold angle. In other embodiments, the first threshold angle is different than the second threshold angle. In some embodiments, the second threshold angle is dynamically determined based on the angle of the vehicle when the turn indicator (user input) is enabled by the user. If the vehicle tilts from the upright, or near-upright, position toward the first threshold angle, but does not exceed the first threshold angle, the turn is not considered to be initiated and a subsequent return to the upright position does not result in generation of a turn off signal. In some embodiments, the processor is implemented to include an auto-cancellation feature where, for example, if the user enabled a turn indicator light but did not initiate and complete a turn, and the user did not manually turn off the turn indicator light, then the processor can send a disable signal to the turn indicator light after a given time. However, once the tilt angle of the vehicle exceeds the first threshold angle, then the turn is considered to be initiated and a subsequent return toward the upright position results in generation of the turn on signal once the tilt angle is less than the second threshold angle.

In some embodiments, the acceleration data is also used to determine if the vehicle speed is greater than zero. Acceleration is only present if the vehicle is in motion. Determining if the vehicle is in motion can be used to better determine if a turn is made. For example, if a vehicle is stopped, such as at a stop light, the vehicle user may place their foot on the ground and tilt the vehicle to prevent the vehicle from following over while waiting for the stop light. This tilt may signal that a turn is initiated. If the user subsequently shifts feet and tilts the vehicle in the opposite direction, this change in title angle would be evaluated as a completed turn, which would result in a turn off signal being sent. To prevent such an inadvertent turning off of the turn indicator light, determination that the vehicle speed is zero would supercede the generation of the turn off signal. For those occasions where the vehicle speed is greater than zero, the determining of an initiated and completed turn proceeds as normal. In other embodiments, the vehicle speed threshold is set at some value greater than zero. This allows for slow speed conditions such as slowly moving forward in traffic. Alternatively, a separate velocity sensor can be used to determine the vehicle speed.

In some embodiments, the turn indicator system includes the ambient light sensor 40. The processor 14 receives the sensed ambient light from the ambient light sensor 40 and determines if the ambient light is below an ambient light threshold value. If it is determined that the ambient light is below the ambient light threshold value, then a turn on signal is generated by the processor 14 and transmitted to the headlight/taillights 54 via the control module 20. In some embodiments, the sensed ambient light data is filtered to prevent shadows from triggering the turn on signal.

In some embodiments, the processor 14 analyzes the filtered acceleration changes to determine if the vehicle is decelerating in the x-axis, where the x-axis is considered the direction of motion along the single-track axis. If it is determined that the vehicle decelerates beyond a deceleration threshold value, then a turn on signal is generated by the processor 14 and transmitted to the brake light 52 via the control module 20. Deceleration can be the result of engaging the brake or reducing engine output, especially in a manual transmission vehicle. In some embodiments, the accelerometer 42 is a three-dimension accelerometer. In this case, the processor 14 can use the filtered acceleration changes to determine if the vehicle is at an incline or decline, signifying the vehicle is traveling uphill or downhill, respectively. Vector math is used to compensate a deceleration of the vehicle due to an incline so as to not inappropriately generate the brake light turn on signal. Vector math is also used to compensate for deceleration of a vehicle due to a decline. For example, if the user decelerates the vehicle as the vehicle begins to go downhill, compensation for gravity is needed to accurately gauge a net vehicle acceleration.

Alternatively to the single-track vehicle implementation, the turn indicator system can be implemented in a multi-track vehicle. In the multi-track vehicle, a turn can be determined by calculating a lateral acceleration of the vehicle. Unlike the single-track vehicle, the multi-track vehicle does not lean appreciably while turning. However, a force is imparted on the vehicle while turning in the form of an acceleration tangent to the arc of the turn. The processor 14 determines an acceleration change in the lateral direction to the x-axis, which is the axis parallel to the axis of the multi-tracks. The processor 14 evaluates the lateral acceleration change similarly as the change in tilt angle related to the single-track implementation. For example, the processor 14 determines if the later acceleration change exceeds a first threshold value, which signifies initiation of a vehicle turn, and if the lateral acceleration change then falls below a second threshold value, which signifies a completion of the vehicle turn, the processor 14 generates and transmits a control signal to turn off the appropriate turn indicator light.

The embodiment shown in FIG. 2 includes a decentralized processing implementation having two separate processors 14 and 24. Alternatively, a centralized processing approach can be implemented. For example, discrete communication paths can be established between a centralized processor and each of the lights to be enabled and disabled. In this manner, the centralized processor can send enable/disable control signals directly to a specific light.

Figure 3:
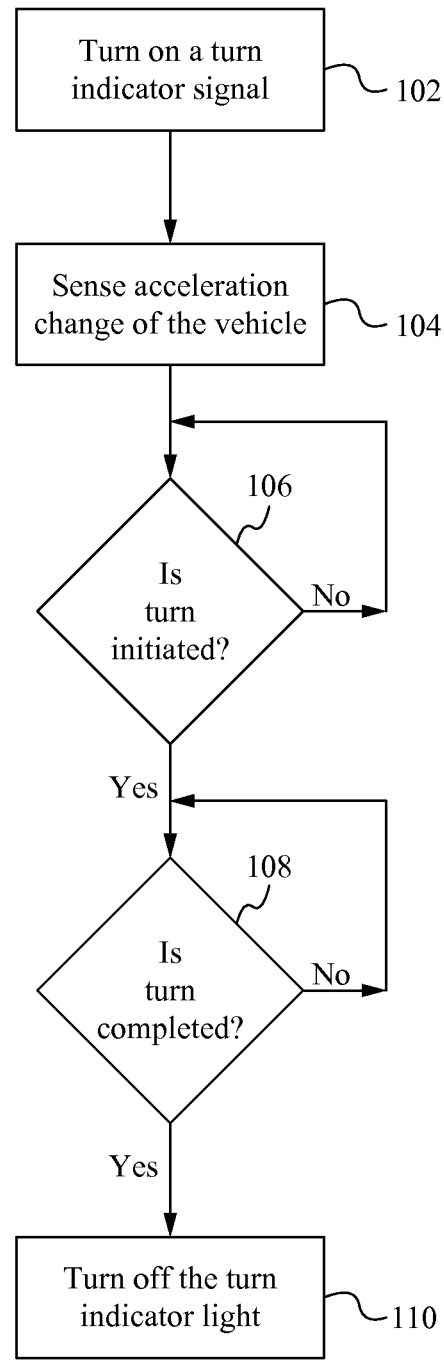
FIG. 3 illustrates a simplified block diagram showing an exemplary process flow of the turn indicator system according to an embodiment.

FIG. 3 illustrates a simplified block diagram showing an exemplary process flow of the turn indicator system according to an embodiment. At the step 102, a turn indicator light is turned on. In some embodiments, the turn indicator light is turned on manually by a user of the vehicle. At the step 104, acceleration changes of the vehicle are sensed, such as by the accelerometer. In some embodiments, orientation of the vehicle is also sensed. The orientation data can be used to filter noise from the acceleration changes. In some embodiments, the acceleration changes correlate to a tilt of a single-track vehicle. In other embodiments, the acceleration changes correlate to tangential acceleration of a multi-track vehicle while turning. A corresponding lateral acceleration change can be determined from the tangential acceleration.

At the step 106, it is determined if a vehicle turn is initiated. In the case of a single-track vehicle, the vehicle turn can be considered initiated if the vehicle tilt angle exceed a first threshold angle. In the case of a multi-track vehicle, the vehicle turn can be considered initiated if the lateral acceleration change exceeds a first threshold value. If it is determined that a vehicle turn is initiated, then the process moves to the step 108. If it is not determined that a vehicle turn has been initiated, then the step 106 is repeated. In some embodiments, the step of determining if the vehicle turn is initiated also includes determining if a vehicle speed is greater than some minimum speed threshold value using the sensed acceleration changes. In this embodiment, the vehicle turn is initiated only if it is also determined that the vehicle speed is greater than the minimum speed threshold value. Otherwise, it is assumed the vehicle is at rest, or minimal speed, and no vehicle turn has been initiated.

At the step 108, it is determined if the vehicle turn is completed. In the case of a single-track vehicle, the vehicle turn can be considered completed if the vehicle tilt angle returns below a second threshold angle. The second threshold angle may or may not be the same as the first threshold angle. In the case of a multi-track vehicle, the vehicle turn can be considered completed if the lateral acceleration change returns below a second threshold value. The second threshold value may or may not be the same as the first threshold value. If it is determined that a vehicle turn is completed, then the process moves to the step 110. If it is not determined that a vehicle turn has been completed, then the step 108 is repeated.

At the step 110, a turn off control signal is generated and transmitted to turn off the turn indicator light.

The process flow can also include optional steps. For example, the process flow can also include determining if the sensed acceleration changes corresponding to a deceleration of the vehicle and turning on a brake light in response to determining that the vehicle is decelerating. In this case, the process flow can also include adjusting the deceleration determination by compensating for deceleration corresponding to the vehicle traveling uphill or downhill. In another example, the process flow can also include sensing an ambient light proximate the vehicle and turning on a vehicle headlight if the sensed ambient light is below a threshold value.

The present application has been described in terms of specific embodiments incorporating details to facilitate the understanding of the principles of construction and operation of the turn indicator system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A method of controlling lights on a vehicle, the method comprising:
   a. turning on a turn indicator light;
   b. sensing acceleration changes of the vehicle;
   c. determining if a vehicle turn is initiated, if the vehicle tilts away from the upright position beyond a first threshold angle;
   d. determining if a vehicle turn is completed, if the vehicle tilts back toward the upright position within a second threshold angle following the initiation of a turn; and
   e. turning off the turn indicator light in response to the sensed acceleration changes when it is determined, by sensing the vehicle tilting from an upright position, that the vehicle turn is completed.

2. The method of claim 1 wherein acceleration changes comprise lateral acceleration changes.

3. The method of claim 1 wherein the vehicle comprises a single-track vehicle that utilizes tilt-steering, further wherein sensing acceleration changes comprises sensing the vehicle tilting from an upright position.

4. The method of claim 1 wherein the first threshold angle is equal to the second threshold angle.

5. The method of claim 4 wherein the first threshold angle is different than the second threshold angle.

6. The method of claim 4 further comprising determining if a vehicle speed is greater than zero using the sensed acceleration changes, and only determining that the vehicle turn is initiated if the vehicle speed is greater than zero.

7. The method of claim 1 wherein the vehicle comprises a multi-track vehicle, further wherein determining if the vehicle turn is initiated and completed comprises determining a lateral acceleration change corresponding to the vehicle turning.

8. The method of claim 1 further comprising determining if the sensed acceleration changes corresponds to a deceleration of the vehicle and turning on a brake light in response to determining that the vehicle is decelerating.

9. The method of claim 8 further comprising adjusting the deceleration determination by compensating for deceleration corresponding to the vehicle traveling uphill.

10. The method of claim 1 further comprising sensing an orientation of the vehicle and filtering the sensed accelerating changes according to the sensed orientation.

11. The method of claim 1 further comprising sensing an ambient light proximate the vehicle and turning on a vehicle headlight if the sensed ambient light is below a threshold value.

12. An apparatus to control lights on a vehicle, the apparatus comprising:
   a. an accelerometer configured to sense acceleration changes of the vehicle;
   b. a processor coupled to the accelerometer to receive the sensed acceleration changes, wherein the processor is configured to determine if a vehicle turn is initiated, if the vehicle tilts away from the upright position beyond a first threshold angle, and completed, if the vehicle tilts back toward the upright position within a second threshold angle following the initiation of a turn, determined by the sensed tilt of the vehicle; and
   c. to send a turn off signal to a turn indicator light in response to the sensed acceleration changes when it is determined that the turn is completed, by sensing the vehicle tilting from an upright position.

13. The apparatus of claim 12 wherein the vehicle comprises a single-track vehicle that utilizes tilt-steering, further wherein the sensed acceleration changes include acceleration changes corresponding to the vehicle tilting from an upright position.

14. The apparatus of claim 12 wherein the vehicle comprises a multi-track vehicle, further wherein the sensed acceleration changes include acceleration changes corresponding to lateral acceleration changes of the vehicle while turning.

15. The apparatus of claim 12 wherein the processor is further configured to determine deceleration along a forward direction and to turn on a brake light in response to determining that the vehicle is decelerating.

16. The apparatus of claim 15 wherein the processor is further configured to adjust the deceleration determination by compensating for deceleration corresponding to the vehicle traveling uphill.

17. The apparatus of claim 12 further comprising a gyroscope to sense an orientation of the vehicle, wherein the processor is further configured to filter the sensed accelerating changes according to the sensed orientation.

18. The apparatus of claim 12 further comprising an ambient light sensor coupled to the processor and configured to sense ambient light, wherein the processor is further configured to send a turn on signal to a vehicle headlight if the sensed ambient light is below a threshold value.

19. A single-track vehicle having tilt-steering comprising:
   a. a left turn indicator light;
   b. a first switch coupled to the left turn indicator light;
   c. a right turn indicator light;
   d. a second switch coupled to the right turn indicator light;
   e. an accelerometer configured to sense acceleration changes of the vehicle;
   f. a gyroscope configured to sense an orientation of the vehicle; and
   g. a processor coupled to the accelerometer to receive the sensed acceleration changes and to the gyroscope to receive the sensed vehicle orientation, wherein the processor is configured to determine if a vehicle left turn or vehicle right turn is initiated, if the vehicle tilts away from the upright position beyond a first threshold angle, and completed, if the vehicle tilts back toward the upright position within a second threshold angle following the initiation of a turn, and to send a turn off signal in response to the sensed acceleration changes to either the first switch or to the second switch when it is determined, by sensing the vehicle tilting from an upright position, that the turn is completed.

* * * * *